United States Patent [19]
Follini et al.

[11] Patent Number: 5,209,890
[45] Date of Patent: May 11, 1993

[54] STYRENE SCRUBBING PROCESS FOR PIPE AND SEWER LINER METHOD

[75] Inventors: Robert J. Follini, New York; Eugene J. Camali, Oyster Bay, both of N.Y.

[73] Assignee: Superliners USA, Inc., Brooklyn, N.Y.

[21] Appl. No.: 782,556

[22] Filed: Oct. 25, 1991

[51] Int. Cl.⁵ .................... B29C 63/34; B29D 23/22
[52] U.S. Cl. ........................... 264/516; 55/84; 156/94; 156/287; 156/294; 264/36; 264/269; 264/135; 264/37; 264/324; 425/210
[58] Field of Search ............... 55/84, 85, 159; 159/6.1, DIG. 10; 264/45.2, 46.1, 36, 37, 514, 516, 269, 347, 134, 135, 324; 156/94, 287, 294; 425/210, 215, 217

[56] References Cited

U.S. PATENT DOCUMENTS

| | | | |
|---|---|---|---|
| 2,575,341 | 11/1951 | Gollmar | 55/85 |
| 3,028,284 | 4/1962 | Reeves | 264/257 |
| 3,111,569 | 11/1963 | Rubenstein | 264/45.2 |
| 3,230,129 | 1/1966 | Kelly | 156/287 |
| 3,511,734 | 5/1970 | Darrow | 264/269 |
| 3,627,290 | 12/1971 | Grieve | 432/48 |
| 3,773,593 | 11/1973 | Casadevall et al. | 156/294 |
| 3,930,931 | 1/1976 | Baughman | 159/6.1 |
| 4,009,063 | 2/1977 | Wood | 264/269 |
| 4,227,891 | 10/1980 | Maguire et al. | 55/85 |
| 4,386,628 | 6/1983 | Stanley | 264/516 |
| 4,640,313 | 2/1987 | Stanley | 264/516 |
| 4,844,721 | 7/1989 | Cox et al. | 55/85 |
| 4,980,090 | 12/1990 | Manihak, Jr. | 264/36 |

FOREIGN PATENT DOCUMENTS

| | | |
|---|---|---|
| 3727635 | 3/1989 | Fed. Rep. of Germany .......... 55/84 |
| 63-159409 | 7/1988 | Japan ........................................ 55/84 |
| 1039836 | 8/1966 | United Kingdom . |
| 1340068 | 12/1973 | United Kingdom . |

*Primary Examiner*—Jeffery Thurlow
*Assistant Examiner*—Mathieu Vargot
*Attorney, Agent, or Firm*—Varnell D. M. Judge Cornish

[57] ABSTRACT

This invention relates to liners containing contaminants, such as styrene, and to methods for lining pipes, such as sewer pipes with liners containing contaminants, such as styrene. In one embodiment, this invention provides a liner and lining method that reduces contamination of the ambient with contaminants from the liner and/or the lining process, such as styrene. In the case of sewers, the carrier pipes lined may be, for example, PVC, clay or concrete, but pipes of metal or other materials, such as asbestos, may also be lined with the liner and lining method of this invention.

4 Claims, 1 Drawing Sheet

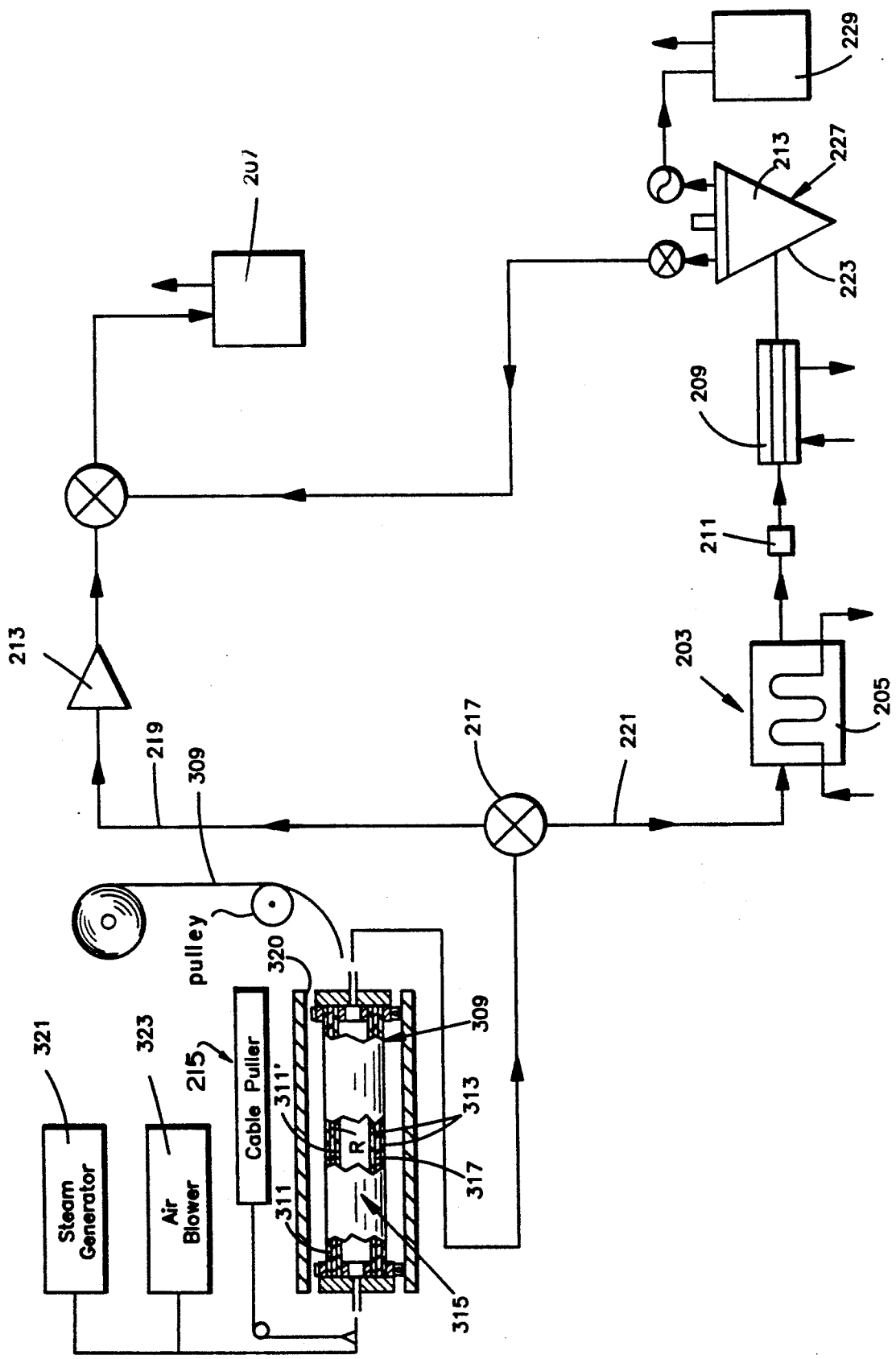

STYRENE SCRUBBING PROCESS FOR PIPE AND SEWER LINER METHOD

BACKGROUND OF THE INVENTION

In the filed of pipe liners and lining methods, a need exists for the reduction or control of the contamination of the ambient that is caused by the liners or lining methods used. This is particularly true in the field of sewer pipes, since these carrier pipes are numerous and they are located in places of high population density where contamination has been a problem. Moreover, large numbers of these pipes cannot be dug up, or it is impractical or expensive to do so, and because many of these pipes need relining in order to prevent danger to the sewage treatment plants connected thereto.

Styrene is one of the dangerous contaminants present in the liners and lining methods used heretofore. For example, in the liner and lining method described in Wood U.S. Pat. No. 4,009,063, the lining is totally impregnated with resins containing styrene, and this or other contaminants have been released to the atmosphere during the lining process. In some cases gaseous styrene was released from the impregnated liner because hot air or steam was circulated through the liner during the curing process, and no effective provision or steps were made to prevent the release of the styrene from the hot air or steam in cases where the styrene was volatilized or stripped out of the resin by the hot air or steam. In other cases, the liner itself was porous or perforated, either on purpose or by accident during the insertion or curing of the liner in a sewer pipe, and this perforation was on the outside of the liner.

SUMMARY OF THE INVENTION

This invention overcomes the difficulties and shortcomings of the prior art by providing a liner that is at least partially closed up to the air or steam used during the curing process. This configuration being at one end of the surface of the liner at a specific location near the end of the liner, helps prevent the liner from being ruptured on the outside of the liner during the lining process. These specific configurations also help control the scrubbing release of the styrene from the liner at a particular location where provision can be made to further process the air and/or steam exhaust and capture the styrene under controlled conditions with suitable apparatus and procedures. With the proper selection of components and their use, as described in more detail hereinafter, the desired reduction in styrene release or contamination of the ambient is provided. Any air used in the curing process and released to the ambient contains styrene at a content of 0.4 parts per million or less.

In another aspect, this invention also provides a specific styrene scrubbing process and apparatus, as will be understood in more detail hereinafter, referring to U.S. Pat. No. 4,009,063, incorporated herein.

In one embodiment, this invention provides a method of lining a surface at least partially defining a passageway wherein a laminate of non woven felt and at least an outer membrane is urged by fluid pressure so that said outer membrane lies against said surface, said method including the additional step of totally impregnating the felt with an uncured thermosetting resin so as to completely immerse the felt in the resin, and curing the resin while the laminate is held against said surface so as to form a hard, cured and self-supporting resin lining having embedded felt reinforcement, said resin containing styrene, and removing and capturing at least a portion of the styrene that is volatilized and released as a gas during at least a portion of the curing time.

BRIEF DESCRIPTION OF THE DRAWINGS

The single FIGURE is a partial schematic drawing of the styrene scrubbing system of this invention.

DESCRIPTION OF THE PREFERRED EMBODIMENT

This invention is useful in removing styrene and/or other contaminants from the resin used in lining sewers or other pipes. As such, this invention is useful in reducing the chemical contamination of the ambient when sewers and other pipes are lined, particularly when they are lined with resins containing styrene. More particularly still, this invention is specifically useful in reducing the contamination of styrene in the ambient around the method used in U.S. Pat. No. 3,511,734, which is incorporated by reference herein, this method closing the liner inside to steam and air by clamp.

Referring to the figure, it will be understood that air and/or steam pressure are used to cure the linings used for sewer pipes, and consequently, if the linings contain styrene, the air and/or the steam will volatilize the styrene from the lining so that the styrene is entrained in the air and steam. Moreover, when the air and steam are vented to the atmosphere, the styrene is injected into the ambient in such a way as to contaminate the ambient air at the site.

In accordance with this invention, the method and apparatus of this invention includes an air purification system 201, a steam recovery system 203, which includes a condenser 205, and an activated carbon adsorption canister 207, which advantageously is a 200 pound activated carbon adsorption and purification system.

The steam condensate recovery and purification system 203 comprises a large condensing coil unit 209 that is used to condense the steam used in the lining system to water, and a small condensing coil unit 211 for lowering the temperature of the condensate to below about 100 degrees fahrenheit. A mechanical drier 213 is also provided to reduce the moisture content of the air coming from the lining system 215. A three way valve system 217 allows for the collection of the air stream 219 into the activated carbon canister 207, which may be activated charcoal. Meanwhile, the water condensate from the steam stream 221, which, like the air stream 219, comes from the lining system 215, is collected in a liquid holding tank 223. A pump 225 with a flat mechanism 227 is used to pull the condensate water from the holding tank 223 through a water use-activated carbon canister 229 also having a 200 pound capacity.

In operation, the system of this invention always captures the air stream 219 and the steam stream 221 from the lining system 215. Also, the air and steam are always purified during the operation of this invention. The 200 pound carbon canisters are able to capture approximately 50 pounds of styrene from the process air stream 219. Likewise the carbon canister 229 captures about 20 pounds of styrene from the steam stream before the carbon has to be replaced. These capacities far exceed the anticipated levels of styrene derived during the curing process that produces the desired lined sewer pipe.

During the processing of the styrene by this invention, the surrounding ambient air is monitored for styrene air concentrations in the ambient atmosphere employing National Institute of Occupational Safety and Health (NIOSH) method 1501, which is the technique requested and approved by NYDEP's HAZMAT division. In this connection, it has been found that styrene has a minute solubility in water, such as the water waste product of the lining system of the '063 patent mentioned above. Thus, OSHA has imposed strict permissible Exposure Limits (PEL's) on the system of that invention.

In this connection, the single figure discloses a method of lining an ID surface 301 of carrier pipe 303, which is a sewer pipe 305. The carrier pipe 305 defines a passageway 307, wherein a laminate 309 of non woven felt is sandwiched between an outer membrane 311 and an inner membrane 311' of plastic sheet material 313 is urged by fluid pressure 315 so that said outer membrane lies against said surface, said method including the additional step of totally impregnating the felt with an uncured thermosetting resin so as to completely immerse the felt in the resin, and curing the resin while the laminate is held against said surface so as to form a hard, cured and selfsustaining resin lining having embedded felt reinforcement R. The felt is shown in the drawing as element 317 and the resin is referred to as element 319. Clamp 320 clamps ends 0 closed.

This invention has the advantage of supplying a practical and economic system for lowering the contamination of air with styrene around the site of pipe linings. In another aspect, this invention also has the advantage of applying the principles thereof to the conventional steam generator 321 and air blower 323 of the Fig.

What is claimed is:

1. A method of lining a surface at least partially defining a passageway wherein a laminate of non woven felt sandwiched between an outer membrane and an inner membrane of plastic sheet material that is at least partially closed up to an urging fluid selected from the group consisting of air and steam is urged by fluid pressure so that said outer membrane lies against said surface, said method including the additional steps of totally impregnating the felt with an uncured thermosetting resin so as to completely immerse the felt in the resin, and curing the resin while the laminate is held against said surface so as to form a hard, cured and self-supporting resin lining having embedded felt reinforcement, said inner and outer membranes comprising linings, and at least said resin containing styrene, and removing and capturing at least some of said styrene that is volatilized and released as a gas during at least a portion of the curing time and wherein the resin is cured by steam that volatilizes the styrene so it is entrained in the steam, and in which the steam is condensed, trapped, cooled and filtered to capture and remove at least a portion of the styrene.

2. The invention of claim 1 in which hot air is added to cure the lining in the lining process so that the resulting air contains styrene, and in which the resulting air is dried and filtered before it is released to the atmosphere.

3. The invention of claim 2 in which the styrene is captured by filtering means that comprises activated carbon.

4. The invention of claim 3 in which the air is filtered and released to the ambient air with a styrene content of 0.4 parts per million or less.

* * * * *